(12) United States Patent
Svendsen

(10) Patent No.: US 8,090,606 B2
(45) Date of Patent: Jan. 3, 2012

(54) EMBEDDED MEDIA RECOMMENDATIONS

(75) Inventor: Hugh Svendsen, Chapel HIll, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 1413 days.

(21) Appl. No.: 11/463,148

(22) Filed: Aug. 8, 2006

(65) Prior Publication Data

US 2009/0070184 A1 Mar. 12, 2009

(51) Int. Cl.
*G06Q 10/00* (2006.01)
(52) U.S. Cl. ........................ 705/7.11; 707/110
(58) Field of Classification Search .................... 707/110
See application file for complete search history.

(56) References Cited

U.S. PATENT DOCUMENTS

| | | | |
|---|---|---|---|
| 4,870,579 A | 9/1989 | Hey | |
| 5,621,456 A | 4/1997 | Florin et al. | |
| 5,771,778 A | 6/1998 | MacLean, IV | |
| 5,956,027 A | 9/1999 | Krishnamurthy | |
| 5,960,437 A | 9/1999 | Krawchuk et al. | |
| 5,963,916 A | 10/1999 | Kaplan | |
| 6,134,552 A | 10/2000 | Fritz et al. | |
| 6,195,657 B1 | 2/2001 | Rucker et al. | |
| 6,266,649 B1 | 7/2001 | Linden et al. | |
| 6,314,420 B1 | 11/2001 | Lang et al. | |
| 6,317,722 B1 | 11/2001 | Jacobi et al. | |
| 6,353,823 B1 | 3/2002 | Kumar | |
| 6,388,714 B1 | 5/2002 | Schein et al. | |
| 6,438,579 B1 * | 8/2002 | Hosken | 709/203 |
| 6,498,955 B1 | 12/2002 | McCarthy et al. | |
| 6,526,411 B1 | 2/2003 | Ward | |
| 6,567,797 B1 | 5/2003 | Schuetze et al. | |
| 6,587,127 B1 | 7/2003 | Leeke et al. | |
| 6,587,850 B2 | 7/2003 | Zhai | |
| 6,609,253 B1 | 8/2003 | Swix et al. | |
| 6,615,208 B1 | 9/2003 | Behrens et al. | |
| 6,629,104 B1 | 9/2003 | Parulski et al. | |
| 6,636,836 B1 | 10/2003 | Pyo | |

(Continued)

FOREIGN PATENT DOCUMENTS

CN 1208930 A 2/1999

(Continued)

OTHER PUBLICATIONS

"Goombah—Preview," http://www.goombah.com/preview.html, printed Jan. 8, 2008, 5 pages.

(Continued)

*Primary Examiner* — Romain Jeanty
*Assistant Examiner* — Luis Santiago
(74) *Attorney, Agent, or Firm* — Withrow & Terranova, PLLC

(57) ABSTRACT

A system and method for embedding recommendations on a portable media player are provided. In general, recommendations for media presentations stored or to be stored on the portable media player are generated by a recommendation engine hosted by an external system such as, for example, a user's personal computer or a network server. In one embodiment, the media presentations are songs, and the recommendations include a number of recommended songs for each song stored or to be stored on the portable media player. The recommendations may be limited to the media presentations stored on the portable media player or otherwise accessible to the portable media player. After the recommendations are generated, the recommendations are stored, or embedded, on the portable media player. Thereafter, the portable media player may use the recommendations to facilitate playback of media content on the portable media player.

27 Claims, 12 Drawing Sheets

U.S. PATENT DOCUMENTS

| | | |
|---|---|---|
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,973,475 B2 | 12/2005 | Kenyon et al. |
| 6,976,228 B2 | 12/2005 | Bernhardson |
| 6,986,136 B2 | 1/2006 | Simpson et al. |
| 6,987,221 B2 | 1/2006 | Platt |
| 6,990,453 B2 | 1/2006 | Wang et al. |
| 7,013,301 B2 | 3/2006 | Holm et al. |
| 7,035,871 B2 * | 4/2006 | Hunt et al. ............ 707/802 |
| 7,047,406 B2 | 5/2006 | Schleicher et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,076,553 B2 | 7/2006 | Chan et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,145,678 B2 | 12/2006 | Simpson et al. |
| 7,171,174 B2 | 1/2007 | Ellis et al. |
| 7,177,872 B2 | 2/2007 | Schwesig et al. |
| 7,219,145 B2 | 5/2007 | Chmaytelli et al. |
| 7,222,187 B2 | 5/2007 | Yeager et al. |
| 7,240,358 B2 | 7/2007 | Horn et al. |
| 7,283,992 B2 | 10/2007 | Liu et al. |
| 7,296,032 B1 | 11/2007 | Beddow |
| 7,305,449 B2 | 12/2007 | Simpson et al. |
| 7,340,481 B1 | 3/2008 | Baer et al. |
| 7,437,364 B1 | 10/2008 | Fredricksen et al. |
| 7,441,041 B2 | 10/2008 | Williams et al. |
| 7,444,339 B2 | 10/2008 | Matsuda et al. |
| 7,463,890 B2 | 12/2008 | Herz et al. |
| 7,469,283 B2 | 12/2008 | Eyal et al. |
| 7,496,623 B2 | 2/2009 | Szeto et al. |
| 7,509,291 B2 | 3/2009 | McBride et al. |
| 7,512,658 B2 | 3/2009 | Brown et al. |
| 7,548,915 B2 | 6/2009 | Ramer et al. |
| 7,590,546 B2 | 9/2009 | Chuang |
| 7,594,246 B1 | 9/2009 | Billmaier et al. |
| 7,614,006 B2 | 11/2009 | Molander |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,676,753 B2 | 3/2010 | Bedingfield |
| 7,680,959 B2 | 3/2010 | Svendsen |
| 7,720,871 B2 | 5/2010 | Rogers et al. |
| 7,725,494 B2 | 5/2010 | Rogers et al. |
| 7,761,399 B2 | 7/2010 | Evans |
| 7,805,129 B1 | 9/2010 | Issa et al. |
| 7,827,110 B1 | 11/2010 | Wieder |
| 7,970,922 B2 | 6/2011 | Svendsen |
| 2001/0013009 A1 | 8/2001 | Greening et al. |
| 2001/0021914 A1 | 9/2001 | Jacobi et al. |
| 2001/0025259 A1 | 9/2001 | Rouchon |
| 2002/0052207 A1 | 5/2002 | Hunzinger |
| 2002/0052674 A1 | 5/2002 | Chang et al. |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 * | 8/2002 | Wallace et al. ............ 725/40 |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2002/0194325 A1 | 12/2002 | Chmaytelli et al. |
| 2002/0194356 A1 | 12/2002 | Chan et al. |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0018799 A1 | 1/2003 | Eyal |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0084044 A1 | 5/2003 | Simpson et al. |
| 2003/0084086 A1 | 5/2003 | Simpson et al. |
| 2003/0084151 A1 | 5/2003 | Simpson et al. |
| 2003/0089218 A1 | 5/2003 | Gang et al. |
| 2003/0097186 A1 * | 5/2003 | Gutta et al. ............ 700/1 |
| 2003/0115167 A1 | 6/2003 | Sharif et al. |
| 2003/0135513 A1 | 7/2003 | Quinn et al. |
| 2003/0137531 A1 | 7/2003 | Katinsky et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0073919 A1 | 4/2004 | Gutta |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021470 A1 | 1/2005 | Martin et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1 | 4/2005 | Blum |
| 2005/0120053 A1 | 6/2005 | Watson |
| 2005/0125221 A1 | 6/2005 | Brown et al. |
| 2005/0125222 A1 | 6/2005 | Brown et al. |
| 2005/0131866 A1 | 6/2005 | Badros |
| 2005/0138198 A1 | 6/2005 | May |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251807 A1 | 11/2005 | Weel |
| 2005/0256756 A1 | 11/2005 | Lam et al. |

| | | |
|---|---|---|
| 2005/0256866 A1 | 11/2005 | Lu et al. |
| 2005/0267944 A1 | 12/2005 | Little, II |
| 2005/0278377 A1 | 12/2005 | Mirrashidi et al. |
| 2005/0278758 A1 | 12/2005 | Bodleander |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085349 A1 | 4/2006 | Hug |
| 2006/0085383 A1 | 4/2006 | Mantle et al. |
| 2006/0095339 A1* | 5/2006 | Hayashi et al. .................. 705/26 |
| 2006/0100924 A1 | 5/2006 | Tevanian, Jr. |
| 2006/0126135 A1 | 6/2006 | Stevens et al. |
| 2006/0130120 A1 | 6/2006 | Brandyberry et al. |
| 2006/0143236 A1 | 6/2006 | Wu |
| 2006/0156242 A1 | 7/2006 | Bedingfield |
| 2006/0167576 A1* | 7/2006 | Rosenberg ....................... 700/94 |
| 2006/0167991 A1 | 7/2006 | Heikes et al. |
| 2006/0173910 A1 | 8/2006 | McLaughlin |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224757 A1 | 10/2006 | Fang et al. |
| 2006/0227673 A1 | 10/2006 | Yamashita et al. |
| 2006/0242201 A1 | 10/2006 | Cobb et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackson |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1* | 7/2007 | Thomas et al. ............ 707/104.1 |
| 2007/0174147 A1 | 7/2007 | Klein, Jr. |
| 2007/0195373 A1 | 8/2007 | Singh |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0233743 A1 | 10/2007 | Rosenberg |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1 | 11/2007 | Lin et al. |
| 2007/0282949 A1 | 12/2007 | Fischer et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0046948 A1 | 2/2008 | Verosub |
| 2008/0052371 A1 | 2/2008 | Partovi et al. |
| 2008/0052630 A1 | 2/2008 | Rosenbaum |
| 2008/0091771 A1 | 4/2008 | Allen et al. |
| 2008/0133601 A1 | 6/2008 | Cervera et al. |
| 2008/0134043 A1 | 6/2008 | Georgis et al. |
| 2008/0134053 A1 | 6/2008 | Fischer |
| 2008/0162435 A1 | 7/2008 | Dooms et al. |
| 2008/0208823 A1 | 8/2008 | Hicken |
| 2008/0209013 A1 | 8/2008 | Weel |
| 2008/0235632 A1 | 9/2008 | Holmes |
| 2008/0261516 A1 | 10/2008 | Robinson |
| 2008/0270561 A1 | 10/2008 | Tang et al. |
| 2008/0306826 A1 | 12/2008 | Kramer et al. |
| 2008/0319833 A1 | 12/2008 | Svendsen |
| 2009/0007198 A1 | 1/2009 | Lavender et al. |
| 2009/0055396 A1 | 2/2009 | Svendsen et al. |
| 2009/0055759 A1 | 2/2009 | Svendsen |
| 2009/0076881 A1 | 3/2009 | Svendsen |
| 2009/0077041 A1 | 3/2009 | Eyal et al. |
| 2009/0077052 A1 | 3/2009 | Farrelly |
| 2009/0077220 A1 | 3/2009 | Svendsen et al. |
| 2009/0083362 A1 | 3/2009 | Svendsen |
| 2009/0129671 A1 | 5/2009 | Hu et al. |
| 2010/0031366 A1 | 2/2010 | Knight et al. |
| 2010/0185732 A1 | 7/2010 | Hyman |
| 2011/0016483 A1 | 1/2011 | Opdycke |
| 2011/0034121 A1 | 2/2011 | Ng et al. |

FOREIGN PATENT DOCUMENTS

| | | |
|---|---|---|
| EP | 0898278 A2 | 2/1999 |
| EP | 1536352 A1 | 6/2005 |
| EP | 1835455 A1 | 9/2007 |
| GB | 2372850 A | 9/2002 |
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |

| | | | |
|---|---|---|---|
| WO | 2004/043064 A1 | 5/2004 | |
| WO | 2005/026916 A2 | 3/2005 | |
| WO | 2005/071571 A1 | 8/2005 | |
| WO | 2006075032 A1 | 7/2006 | |
| WO | 2006/126135 A2 | 11/2006 | |
| WO | 2007092053 A1 | 8/2007 | |

OTHER PUBLICATIONS

Jeff Mascia et al., "Lifetrak: Music In Tune With Your Life," copyright 2006, 11 pages.

Jun Wang et al., "Music Recommender System for Wi-Fi Walkman," Delft University of Technology, 23 pages.

"Gracenote Playlist" Product Overview, from www.gracenote.com, Dec. 29, 2005, 2 pages.

"Gracenote Playlist Plus" Product Overview, from www.gracenote.com, Dec. 29, 2005, 2 pages.

"Ringo: Social Information Filtering for Music Recommendation," http://jolomo.net/ringo.html, printed Aug. 3, 2009, 1 page.

"Tour's Profile," http://mog.com/Tour, copyright 2006-2009 Mog Inc., printed Aug. 3, 2009, 11 pages.

"Amazon.com: Online Shopping for Electronics, Apparel, Computers, Books, DVDs & m . . . ," http://www.amazon.conn/, copyright 1996-2007 Amazon.com, Inc., printed Oct. 26, 2007, 4 pages.

"Apple—iPod classic," http://www.apple.com/ipodclassic/, printed Oct. 26, 2007, 1 page.

"betterPropaganda—Free MP3s and music videos.," http://www.betterpropaganda.com/, copyright 2004-2005 betterPropaganda, printed Feb. 7, 2007, 4 pages.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.

"ChoiceStreann Technology Brief, Review of Personalization Technologies: Collaborative Filtering vs. ChoiceStream's Attributized Bayesian Choice Modeling," 13 pages.

"The Classic TV Database—Your Home For Classic TV!—www.classic-tv.com," http://www.classic-tv.com, copyright The Classic TV Database—www.classic-tv.com, printed Feb. 7, 2007, 3 pages.

"Digital Tech Life >> Download of the Week," http://www.digitaltechlife.com/category/download-of-the-week/, printed Feb. 16, 2007, 9 pages.

"MP3 music download website, eMusic," http://www.emusic.com/, copyright 2007 eMusic.com Inc., printed Feb. 7, 2007, 1 page.

"GenieLab::Music Recommendation System," http://web.archive.org/web/20060813000442/http://genielab.com/, copyright 2005 GenieLab, LLC, printed Oct. 26, 2007, 1 page.

"The Daily Barometer—GenieLab.com grants music lovers' wishes, http://media.barometer.orst.edu/home/index.cfm?event=displayArticlePrinterFriendly&uSt . . . ," copyright 2007 The Daily Barometer, printed Feb. 16, 2007, 2 pages.

"Gracenote," http://www.gracenote.com, printed Feb. 7, 2007, 1 page.

"IEEE 802.11—Wikipedia, the free encyclopedia," http://en.wikipedia.org/wiki/IEEE_802.11, printed Oct. 26, 2007, 5 pages.

"iLikeTM—Home," http://www.ilike.com/, copyright 2007 iLike, printed May 17, 2007, 2 pages.

"The Internet Movie Database (IMDb)," http://www.imdb.com/, copyright 1990-2007 Internet Movie Database Inc., printed Feb. 7, 2007, 3 pages.

"Apple—iPod +iTunes," http://www.apple.com/itunes/, copyright 2007 Paramount Pictures, printed Feb. 7, 2007, 2 pages.

"last.fm the social music revolution," 1 page.

"Last.fm—Wikipedia, the free encyclopedia," http://en.wikipedia.org/wiki/Last.fm, printed Aug. 8, 2006, 7 pages.

"LimeWire—Wikipedia, the free encyclopedia," http://en.wikipedia.org/wiki/LimeWire, printed Aug. 8, 2006, 2 pages.

"liveplasma music, movies, search engine and discovery engine," http://www.liveplasma.com, printed May 17, 2007, 1 page.

"Loomia—Personalized Recommendations for Media, Content and Retail Sites," http://www.loomia.com/, copyright 2006-2007 Loomia Inc., printed Feb. 7, 2007, 2 pages.

"Mercora—Music Search and Internet Radio Network," http://www.mercora.com/overview.asp, copyright 2004-2006 Mercora, Inc., printed Aug. 8, 2006, 1 page.

"Mercora—Music Search and Internet Radio Network," http://www.mercora.com/v6/_front/web.jsp, printed Feb. 7, 2007, 1 page.

"Welcome to the MUSICMATCH Guide," http://www.mmguide.musicmatch.com/, copyright 2001-2004 Musicmatch, Inc., printed Feb. 7, 2007, 1 page.

"Mongomusic.com—The Best Download mp3 Resources and Information. This website is for sale!," http://www.mongomusic.com/, printed May 17, 2007, 2 pages.

"Take a look at the Future of Mobile Music :: Music Guru," http://www.symbian-freak.com/news/006/02/music_guru.htm, copyright 2005 Symbian freak, printed Feb. 7, 2007, 3 pages.

"Music Recommendations 1.0—MacUpdate," http://www.macupdate.com/info.php/id/19575, printed Feb. 16, 2007, 1 page.

"MusicGremlin," http://www.musicgremlin.com/StaticContent.aspx?id=3, copyright 2005, 2006, 2007 MusicGremlin, Inc., printed Oct. 26, 2007, 1 page.

"MusicIP—The Music Search Engine," http://www.musicip.com/, copyright 2006-2007 MusicIP Corporation, printed Feb. 7, 2007, 1 page.

"Digital Music News," http://www.digitalmusicnews.com/results?title=musicstrands, copyright 2003-6 Digital Music News, printed Aug. 8, 2006, 5 pages.

"Musicstrands.com Because Music is Social," copyright 2006 MusicStrands, Inc., 2 pages.

"MyStrands for Windows 0.7.3 Beta," copyright 2002-2006 ShareApple.com networks, printed Jul. 16, 2007, 3 pages.

"MyStrands for Windows Change Log," http://www.mystrands.com/mystrands/windows/changelog.vm, printed Jul. 16, 2007, 6 pages.

"MyStrands Download," http://www.mystrands.com/overview.vm, printed Feb. 7, 2007, 3 pages.

"Napster—All The Music You Want," http://www.napster.com/using_napster/all_the_music_you_want.html, copyright 2003-2006 Napster, LLC, printed Feb. 7, 2007, 2 pages.

"Try Napster free for 7 Days—Play and download music without paying per song.," http://www.napster.com/choose/index.html, copyright 2003-2007 Napster, LLC, printed Feb. 7, 2007, 1 page.

"FAQ," http://blog.pandora.com/faq/, copyright 2005-2006 Pandora Media, Inc., printed Aug. 8, 2006, 20 pages.

"Pandora Internet Radio—Find New Music, Listen to Free Web Radio," http://www.pandora.com/, copyright 2005-2007 Pandora Media, Inc., printed Feb. 7, 2007, 1 page.

"Pandora Radio—Listen to Free Internet Radio, Find New Music," http://www.pandora.com/mgp, copyright 2005-2007 Pandora Media, Inc., printed Oct. 26, 2007, 1 page.

"Rhapsody—Full-length music, videos and more—Free," http://www.rhapsody.com/welcome.html, copyright 2001-2007 Listen.com, printed Feb. 7, 2007, 1 page.

Badrul M. Sarwar et al., "Recommender Systems for Large-scale E-Commerce: Scalable Neighborhood Formation Using Clustering," 2002, 6 pages.

"Soundflavor," http://www.soundflavor.com/, copyright 2003-2007 Soundflavor, Inc., printed Feb. 7, 2007, 1 page.

"that canadian girl >> Blog Archive >> GenieLab," http://www.thatcanadiangirl.co.uk/blog/2005/02/22/genielab/, copyright 2007 Vero Pepperrell, printed Feb. 16, 2007, 3 pages.

"UpTo11.net—Music Recommendations and Search," http://www.upto11.net/, copyright 2005-2006 Upto11.net, printed Feb. 7, 2007, 1 page.

"Webjay—Playlist Community," http://www.webjay.org/, copyright 2006 Yahoo! Inc., printed Feb. 7, 2007, 5 pages.

"Wired News:," http://www.wired.com/news/digiwoo/1,57634-0.html, copyright 2005 Lycos, Inc., printed Oct. 9, 2006, 3 pages.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"Yahoo Music Jukebox—Wikipedia, the free encyclopedia," http://en.wikipedia.org/wiki/Yahoo_music_engine, printed Aug. 8, 2006, 1 page.

"Music Downloads—Over 2 Million Songs—Try It Free—Yahoo! Music," http://music.yahoo.com/ymu/default.asp, copyright 2006 Yahoo! Inc., printed Feb. 7, 2007, 1 page.

"YouTube—Broadcast Yourself.," http://www.youtube.com/, copyright 2007 YouTube, LLC, printed Oct. 26, 2007, 2 pages.

"Instant Messenger—Aim—Instant Message Your Online Buddies for Free—AIM," http://dashboard.aim.com/aim, copyright 2007 AOL LLC, printed Nov. 8, 2007, 6 pages.

"Outlook Home Page—Microsoft Office Online," http://office.microsoft.com/en-us/outlook/default.aspx, copyright 2007 Microsoft Corporation, printed Nov. 8, 2007, 1 page.

"Thunderbird—Reclaim your inbox," http://www.mozilla.com/en-US/thunderbird/, copyright 2005-2007 Mozilla, printed Nov. 8, 2007, 2 pages.

"RYM FAQ—Rate Your Music," http://rateyourmusic.com/faq/, copyright 2000-2007 rateyournnusic.com, printed Nov. 8, 2007, 14 pages.

"Trillian (software)—Wikipedia, the free encyclopedia," http://en.wikipedia.org/wiki/Trillian_(instant_messenger), printed Nov. 8, 2007, 11 pages.

"Not safe for work—Wikipedia, the free encyclopedia," http://en.wikipedia.org/wiki/Work_safe, printed Nov. 8, 2007, 2 pages.

"Zune.net—How-To—Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.

"LAUNCHcast Radio—Yahoo! Messenger," http://messenger.yahoo.com/launch.php, copyright 2007 Yahoo! Inc., printed Nov. 8, 2007, 1 page.

Barrie-Anthony, Steven, "That song sounds familiar," Los Angeles Times, Feb. 3, 2006, available from http://www.calendarlive.com/printedition/calendar/ci-et-pandora3feb03,0,7458778.story?track=tottext,0,19432.story? track=tothtml, 5 pages.

Yahoo! Music downloaded archival page from www.archive.org for Jun. 20, 2005, copyright 2005 Yahoo! Inc., 14 pages.

Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.

Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.

"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.

"Identifying iPod models," http://support.apple.com/kb/HT1353, printed Feb. 24, 2010, 13 pages.

Mitchell, Bradley, "Cable Speed—How Fast is Cable Modem Internet?," http://www.compnetworking.about.com/od/intemetaccessbestuses/f/cablespeed.htm, printed Feb. 24, 2010, 2 pages.

"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.

"Hulu—About," www.hulu.com/about/product_tour, copyright 2010 Hulu LLC, printed Jun. 15, 2010, 2 pages.

Nilson, Martin, "id3v2.4.0-frames—ID3.org," http://www.id3.org/id3v2.4.0-frames, Nov. 1, 2000, copyright 1998-2009, printed Jun. 15, 2010, 31 pages.

"Songbird," http://getsongbird.com/, copyright 2010 Songbird, printed Jun. 15, 2010, 2 pages.

"SongReference," http://songreference.com/, copyright 2008, SongReference.com, printed Jun. 15, 2010, 1 page.

* cited by examiner

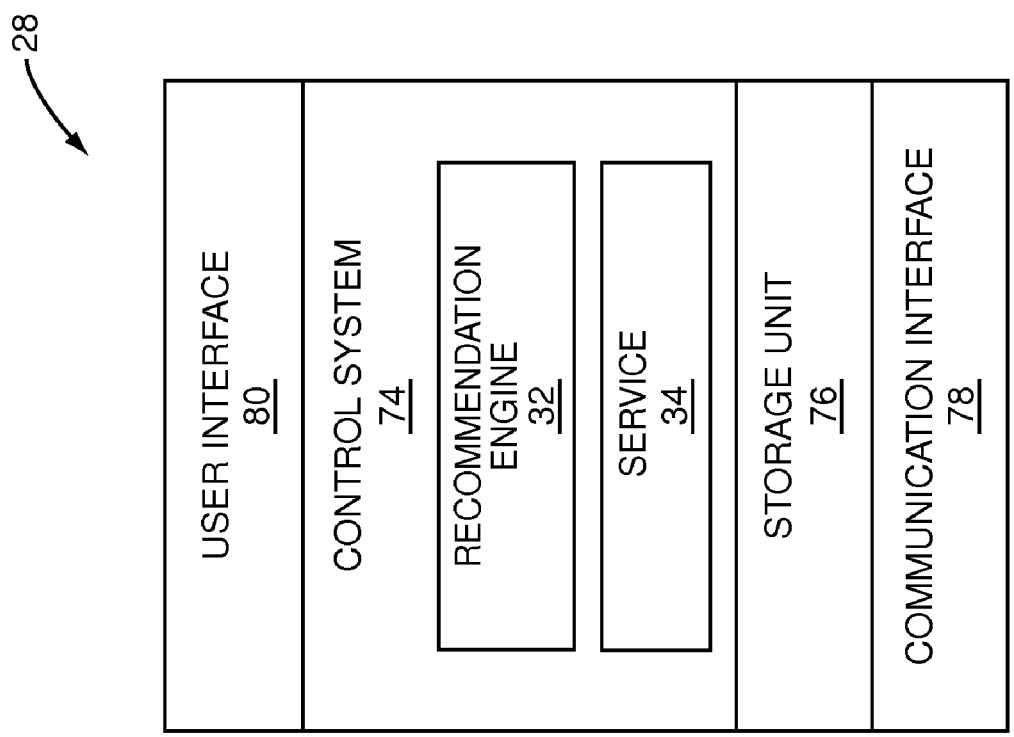

EMBEDDED MEDIA RECOMMENDATIONS

FIELD OF THE INVENTION

The present invention relates to generating media recommendations such as music recommendations, and more particularly relates to embedding media recommendations on a portable media player.

BACKGROUND OF THE INVENTION

Recommendation technologies are emerging as an important enabler in helping users identify and navigate their music collections. However, implementing recommendation systems can be expensive in terms of computing resources, and the best recommendation systems rely on a mix of content analysis and social networks to obtain optimal results. As such, resource-constrained devices, such as portable media players, are unable to enjoy the benefits of recommendation technology. Thus, there is a need for a system and method for generating recommendations for a portable media player and then storing, or embedding, the recommendations on the portable media player in such a manner that the recommendations can be accessed at run time with minimal computing resources.

SUMMARY OF THE INVENTION

The present invention provides a system and method for embedding recommendations on a portable media player. In general, recommendations for media presentations stored or to be stored on the portable media player are generated by a recommendation engine hosted by an external system such as, for example, a user's personal computer or a network server. In one embodiment, the media presentations are songs, and the recommendations include a number of recommended songs for each song stored or to be stored on the portable media player. The recommendations may be limited to the media presentations stored on the portable media player or otherwise accessible to the portable media player. After the recommendations are generated, the recommendations are stored, or embedded, on the portable media player. In one embodiment, the recommendations are stored in an application file or light-weight database stored on the portable media player. In another embodiment, the recommendations are stored as metadata within corresponding media files stored on the portable media player. Thereafter, the portable media player may use the recommendations to facilitate playback of media content on the portable media player.

More specifically, in one embodiment, a user system such as a personal computer hosts a media collection of a user associated with the user system and the portable media player. The recommendation engine is hosted by the user system and operates to generate recommendations for each media presentation in the user's media collection. Thereafter, when media presentations are transferred to the portable media player during a synchronization process, the recommendations, or a filtered version thereof, are also transferred to the portable media player. The recommendations may be filtered such that the recommendations transferred to the portable media player are limited to the media presentations stored on the portable media player and, optionally, to media presentations accessible to the portable media player via a network service.

In another embodiment, a user system such as a personal computer hosts a media collection of a user associated with the user system and the portable media player. The recommendation engine is hosted by a server communicatively coupled to the user system via a network. The recommendation engine generates recommendations and provides the recommendations to the user system. Thereafter, when media presentations are transferred to the portable media player during a synchronization process, the recommendations, or a filtered version thereof, are also transferred to the portable media player. The recommendations may be filtered such that the recommendations transferred to the portable media player are limited to the media presentations stored on the portable media player and, optionally, to media presentations accessible to the portable media player via a network service.

In yet another embodiment, the portable media player has network access to a server hosting the recommendation engine. The recommendation engine generates recommendations and provides the recommendations to the portable media player. The recommendations may be limited to the media presentations stored on the portable media player, to media presentations available via a network service, or to both media presentations stored on the portable media player and media presentations available via a network service.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 14 is a block diagram of an exemplary embodiment of the server 28 of FIGS. 4-9.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a system and method for embedding recommendations on a portable media player. In general, recommendations for media presentations stored or to be stored on the portable media player are generated by a recommendation engine hosted by an external system such as, for example, a user's personal computer or a network server. In one embodiment, the media presentations are songs, and the recommendations include a number of recommended songs for each song stored or to be stored on the portable media player. The recommendations may be limited to the media presentations stored on the portable media player or otherwise accessible to the portable media player. After the recommendations are generated, the recommendations are stored, or embedded, on the portable media player. Thereafter, the portable media player may use the recommendations to facilitate playback of media content on the portable media player.

While the following discussion focuses on digital music, the present invention is not limited thereto. The present invention is equally applicable to other types of media content, such as video content, as will be apparent to one of ordinary skill in the art upon reading this disclosure. Examples of video content are movies, television programs, and like.

Figure 1:
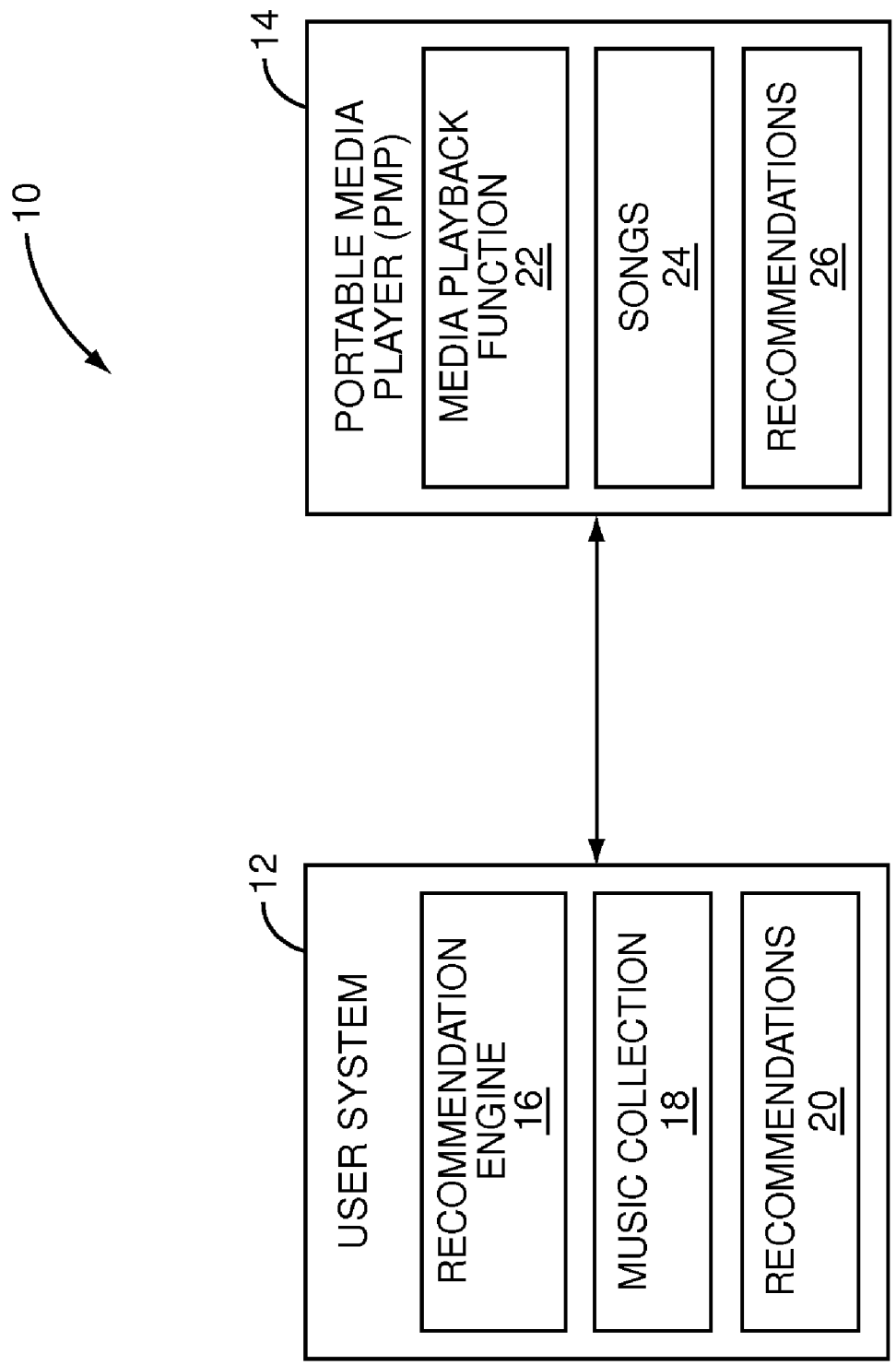
FIG. 1 illustrates a system for embedding recommendations on a portable media player according to a first embodiment of the present invention.

FIG. 1 illustrates a system 10 for embedding recommendations on a portable media player according to a first embodiment of the present invention. In this embodiment, the system 10 includes a user system 12 and a portable media player (PMP) 14, where the user system 12 and PMP 14 are communicatively coupled during a synchronization process, as described below. The user system 12 may be, for example, a personal computer. The user system 12 includes a recommendation engine 16, a music collection 18, and recommendations 20. The recommendation engine 16 may be implemented in software, hardware, or a combination of software and hardware. The music collection 18 includes a number of digital song files stored in one or more digital storage units within or associated with the user system 12. In operation, the recommendation engine 16 operates to generate the recommendations 20 for each song in the music collection 18. More specifically, for each particular song, the recommendation engine 16 generates recommendations 20 identifying other songs that are similar to that song. In this embodiment, the recommended songs are limited to other songs in the music collection 18. However, as discussed below, the present invention is not limited thereto.

The recommendations 20 include information identifying a number of recommended songs for each song in the music collection 18. The information identifying the recommended songs may be any information capable of identifying the recommended songs such as, for example, Globally Unique Identifiers (GUIDs), titles of the songs, or the like. The recommendations 20 may be stored in an application file, lightweight database, or the like. Note that while the following discussion focuses on an application file, it is to be understood that a light-weight database or the like may be used instead. Alternatively, for each particular song, the recommendations 20 for that song may be stored as metadata within the song file.

The PMP 14 may be a portable media player such as, for example, a Motion Pictures Expert Group (MPEG) Layer 3 (MP3) player, an Apple iPod portable media player, a MusicGremlin portable media player, or the like. The PMP 14 includes a media playback function 22, songs 24, and recommendations 26. The media playback function 22 may be implemented in hardware, software, or a combination of hardware and software and operates to provide playback of the songs 24 stored on the PMP 14. The songs 24 are stored in one or more digital storage units within the PMP 14. The digital storage units may be, for example, hard-disc drives, internal memory, removable memory cards, optical storage devices, or the like. The songs 24 may be songs transferred to the PMP 14 from the user system 12 during a synchronization process. Additionally, as discussed below, the songs 24 may include songs obtained from a subscription-based music service or an e-commerce service via a network. The recommendations 26 include information identifying recommended songs for each of the songs stored on the PMP 14. As discussed below, the recommendations 26 are either the recommendations 20 generated by the recommendation engine 16 or a filtered version thereof. Again, the recommendations 26 may be stored as an application file, light-weight database, or the like. Alternatively, for each of the songs 24, the recommendations 26 for the song may be stored as metadata within the corresponding song file.

Figure 2:
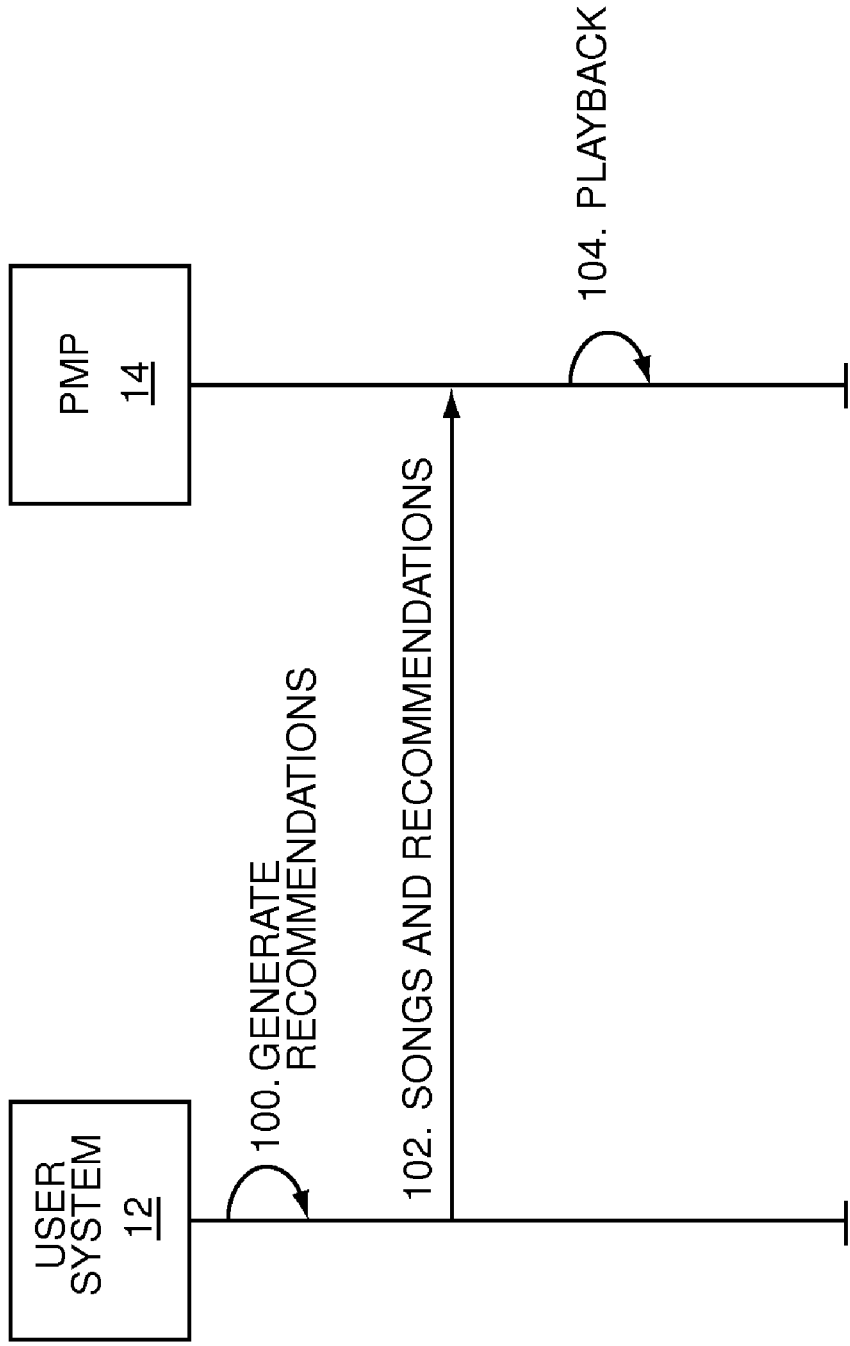
FIG. 2 illustrates the operation of the system of FIG. 1 according to one embodiment of the present invention.

FIG. 2 illustrates the operation of the system 10 of FIG. 1 according to one embodiment of the present invention. First, the recommendation engine 16 of the user system 12 generates recommendations for the songs in the user's music collection 18 (step 100). In this embodiment, the recommendations are limited to other songs in the music collection 18, and the recommendation engine 16 generates recommendations for each of the songs in the music collection 18 prior to the selection of songs to transfer to the PMP 14. The recommendations may thereafter be updated when, for example, new songs are added to the music collection 18.

The recommendation engine 16 may identify other songs from the music collection 18 to recommend for each song using any known music recommendation scheme. For example, the recommendation engine 16 may consider metadata such as, but not limited to, genre, artist, album, release date and/or song attributes such as, but not limited to, beats-per-minute and the like. Exemplary music recommendation schemes are described in U.S. patent application Ser. No. 11/471,797, entitled HISTORICAL MEDIA RECOMMENDATION SERVICE, filed Jun. 21, 2006 and U.S. Patent Application Publication No. 2004/0107821, entitled METHOD AND SYSTEM FOR MUSIC RECOMMENDATION, published Jun. 10, 2004, both of which are hereby incorporated herein by reference in their entireties.

The user system 12 then provides select songs from the music collection 18 and the recommendations 20, or a filtered version of the recommendations 20, to the PMP 14 during a synchronization process (step 102). Once received by the PMP 14, the select songs and recommendations are stored by the PMP 14 as the songs 24 and recommendations 26. The select songs provided to the PMP 14 are preferably selected by the user of the user system 12 for transfer to the PMP 14.

As discussed above, the recommendations 20 for the songs in the music collection 18 may be stored in an application file or stored as metadata within the song files. If the recommendations 20 for the songs in the music collection 18 are stored in an application file, the user system 12 may provide the application file including the recommendations 20 for all of the songs in the music collection 18 to the PMP 14 to be stored as the recommendations 26 on the PMP 14. Thereafter, the PMP 14 may ignore the recommendations for songs not transferred to or already stored on the PMP 14. Further, for songs that are stored on or to be transferred to the PMP 14, the PMP 14 may further ignore recommendations identifying songs that are not stored on the PMP 14.

Alternatively, the user system 12 may filter the recommendations 20 in the application file prior to transfer to the PMP 14 to provide the recommendations 26 for the PMP 14. The recommendations 20 may be filtered in order to limit the recommendations 26 to the songs 24 stored on the PMP 14. More specifically, the recommendations 20 may be filtered to remove the recommendations 20 for songs not transferred to, to be transferred to, or already stored on the PMP 14. For songs that are transferred to, to be transferred to, or already stored on the PMP 14, the user system 12 may further filter the recommendations 20 to remove recommendations identifying songs that are not transferred to, to be transferred to, or already stored on the PMP 14.

In order to filter the recommendations 20, the user system 12 may wait for all select songs to be transferred, or at least selected for transfer, to the PMP 14. At that point, the user system 12 may filter the recommendations 20 in the application file. For example, if a first song in the music collection 18 is not transferred to, to be transferred to, or already stored on the PMP 14, the user system 12 may filter the recommendations 20 in the application file to remove the recommendations for the first song from the application file. Further, if the first song is a recommended song for a second song that is transferred or to be transferred to the PMP 14, the user system 12 may filter the recommendations 20 in the application file to remove the first song from the list of recommended songs for the second song. The filtered recommendations may then be transferred to the PMP 14.

In a similar fashion, if the recommendations 20 are stored as metadata within the song files, the select songs, or more specifically the corresponding song files, are transferred to the PMP 14. Thereafter, the PMP 14 may ignore recommendations identifying songs that are not stored on the PMP 14. Alternatively, before transferring the select songs and recommendations 20 to the PMP 14, the user system 12 may wait for all select songs to be identified. Then, before transferring the select songs to the PMP 14, the user system 12 may filter the recommendations 20 for the select songs to remove recommendations identifying songs that are not also to be transferred to the PMP 14 or are already stored on the PMP 14 from the metadata of the song files. The filtered recommendations are provided to the PMP 14 and stored as, or as part of, the recommendations 26. As a result, the recommendations stored in the metadata of the select song files are filtered before transferring the songs and recommendations to the PMP 14 such that the recommendations 26 on the PMP 14 are limited to the songs 24 stored on the PMP 14.

At this point, synchronization is complete, and the PMP 14 may be decoupled from the user system 12. While the PMP 14 is decoupled from the user system 12, the PMP 14 may use the recommendations 26 to facilitate playback of the songs 24 (step 104). More specifically, in one embodiment, the user of the PMP 14 may select songs to play in traditional fashion. For example, the user may select one or more of the songs 24 for playback, generate a play list identifying a number of the songs 24 for playback, select a previously defined playlist, instruct the PMP 14 to randomly select or automatically "shuffle" the songs 24 or a group of the songs 24, or the like. In addition, the user may instruct the PMP 14 to play a number of the recommendations 26 associated with each of the selected songs for playback. This is referred to herein as a "play by recommendation" mode of operation.

In another embodiment, the PMP 14 may be instructed or configured to operate in a "more like this" mode. In this mode, a seed song is selected, and the PMP 14 plays one or more recommendations associated with the seed song. In a third embodiment, the PMP 14 enables the user to browse, or navigate, the recommendations 26 to select songs for playback.

Figure 3:
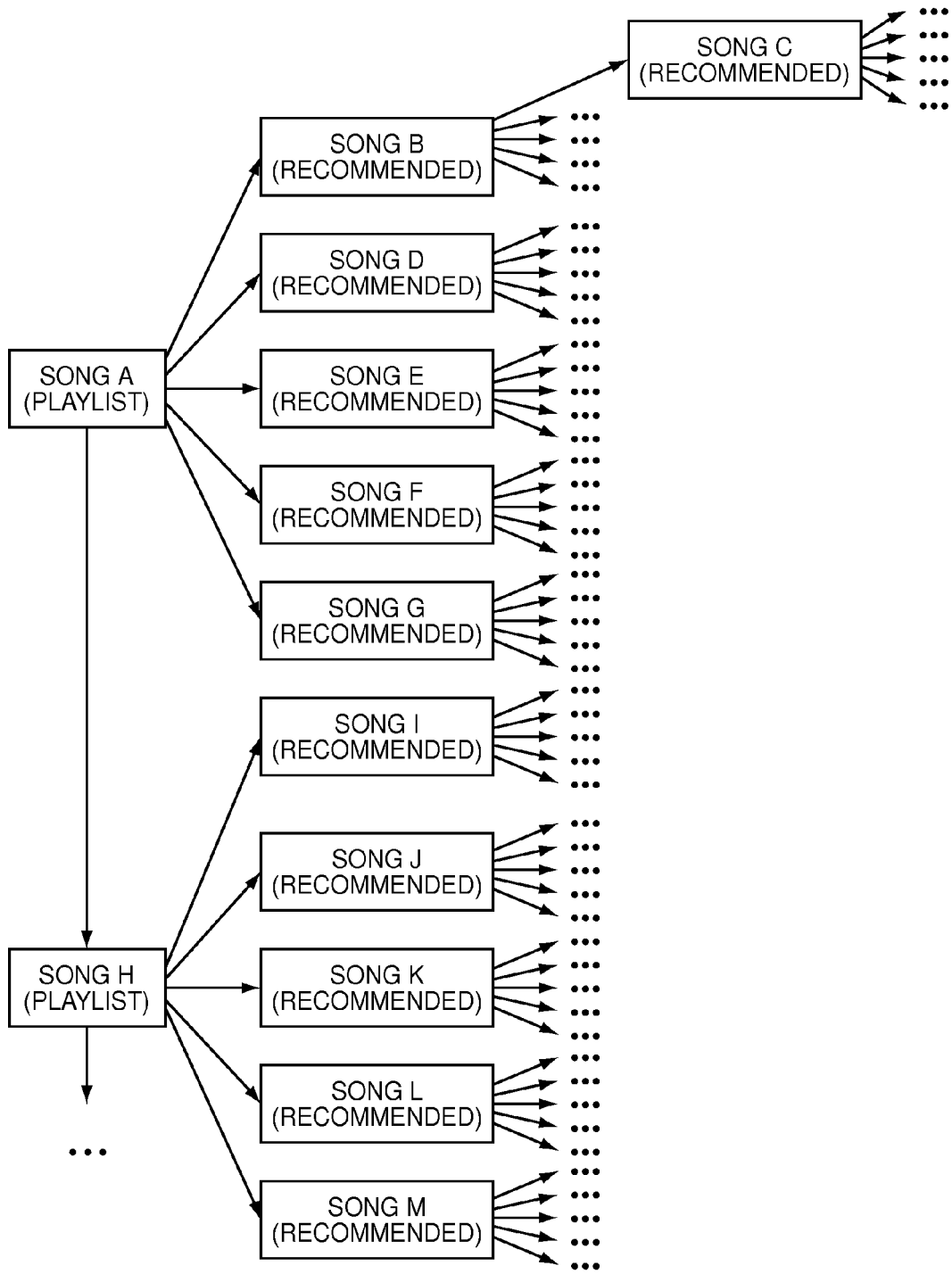
FIG. 3 illustrates one embodiment of the recommendation scheme of the present invention.

FIG. 3 illustrates playback of a playlist and recommendations according to an exemplary embodiment of the present invention. Before discussing exemplary playback scenarios, it may be beneficial to briefly discuss the illustrated recommendation scheme. In this example, the playlist includes SONG A and SONG H. SONG B-SONG G are recommended songs for SONG A and may be stored either in an application file or as metadata within the song file for SONG A. SONG B and SONG D-SONG G may be referred to herein as direct, or level 1, recommendations for SONG A. Each of the songs SONG B-SONG G has associated recommendations, which may be referred to as indirect, or level 2, recommendations for SONG A. For example, SONG C is a recommended song for SONG B and is an indirect, or level 2, recommendation for SONG A. The chain of recommended songs continues indefinitely, as denoted by the ellipses. In a similar fashion, SONG H, which is the second song in the playlist, has an associated series of direct and indirect recommendations, shown as SONG I-SONG M.

As a first exemplary playback scenario, the PMP 14 operates in the play by recommendation mode, and either user defined preferences or a default setting of the PMP 14 define a number of recommendations for play for each song in the playlist and the number of recommendation levels to traverse. In this example, the number of recommendations to play for each song is unlimited and the number of recommendation levels to traverse is two. The PMP 14 first plays SONG A. Next, the PMP 14 proceeds to the direct or level 1 recommendations for SONG A and plays SONG B. Then, since the PMP 14 is to traverse two recommendation levels, the PMP 14 may play SONG C and the other level 2 recommendations associated with SONG B. Next, the PMP 14 may play SONG D and the associated level 2 recommendations, then SONG E and the associated level 2 recommendations, then SONG F and the associated level 2 recommendations, and then SONG G and the associated level 2 recommendations. The PMP 14 may then proceed to play the next song in the playlist, SONG H, and the associated level 1 and level 2 recommendations. The process may continue until the PMP 14 reaches the end of the playlist.

Rather than sequentially stepping through the level 1 and level 2 recommendations, the PMP 14 may operate to randomly select or shuffle the level 1 recommendations, the level 2 recommendations, or both the level 1 and level 2 recommendations.

As a second exemplary playback scenario, the PMP 14 operates in the play by recommendation mode, the number of recommendations to play for each song is limited to three songs, and the number of recommendation levels to traverse is two. The PMP 14 first plays SONG A. Next, the PMP 14 selects three songs from the level 1 and level 2 recommendations associated with SONG A. The PMP 14 may select the three songs randomly or based on user preferences. For example, the user may prefer level 1 recommendations. As such, the PMP 14 may select the three songs from the level 1 recommendations for SONG A. Next, the PMP 14 proceeds to play the next song in the playlist, SONG H, and then three of the associated level 1 and level 2 recommendations. The process continues until the PMP 14 reaches the end of the playlist.

Rather than selecting initial songs using a playlist, the PMP 14 may be configured to operate in a shuffle mode where the PMP 14 randomly selects songs to play from a playlist, from a group of the songs 24 stored on the PMP 14, or from all of the songs 24 stored on the PMP 14. Once a song is selected by the PMP 14, the PMP 14 may play the selected song and one or more of the direct and indirect recommendations associated with the song in a manner similar to that described above.

The PMP 14 may alternatively operate in the more like this mode, where the user of the PMP 14 may select a seed song and instruct the PMP 14 to play other songs that are like the seed song. In response, the PMP 14 may play one or more of the direct and indirect recommendations associated with the seed song in a manner similar to that described above.

In any of the modes of operation described above, there may be a user defined or default "no repeat window." The no repeat window is a defined period of time during which no song may be repeated. For example, the no repeat window may be defined as a number of songs that must be played before a song may be repeated or by an amount of time that must pass before a song may be repeated. The no repeat window may be desirable since the same song may be recommended for any number of other songs.

Figure 4:
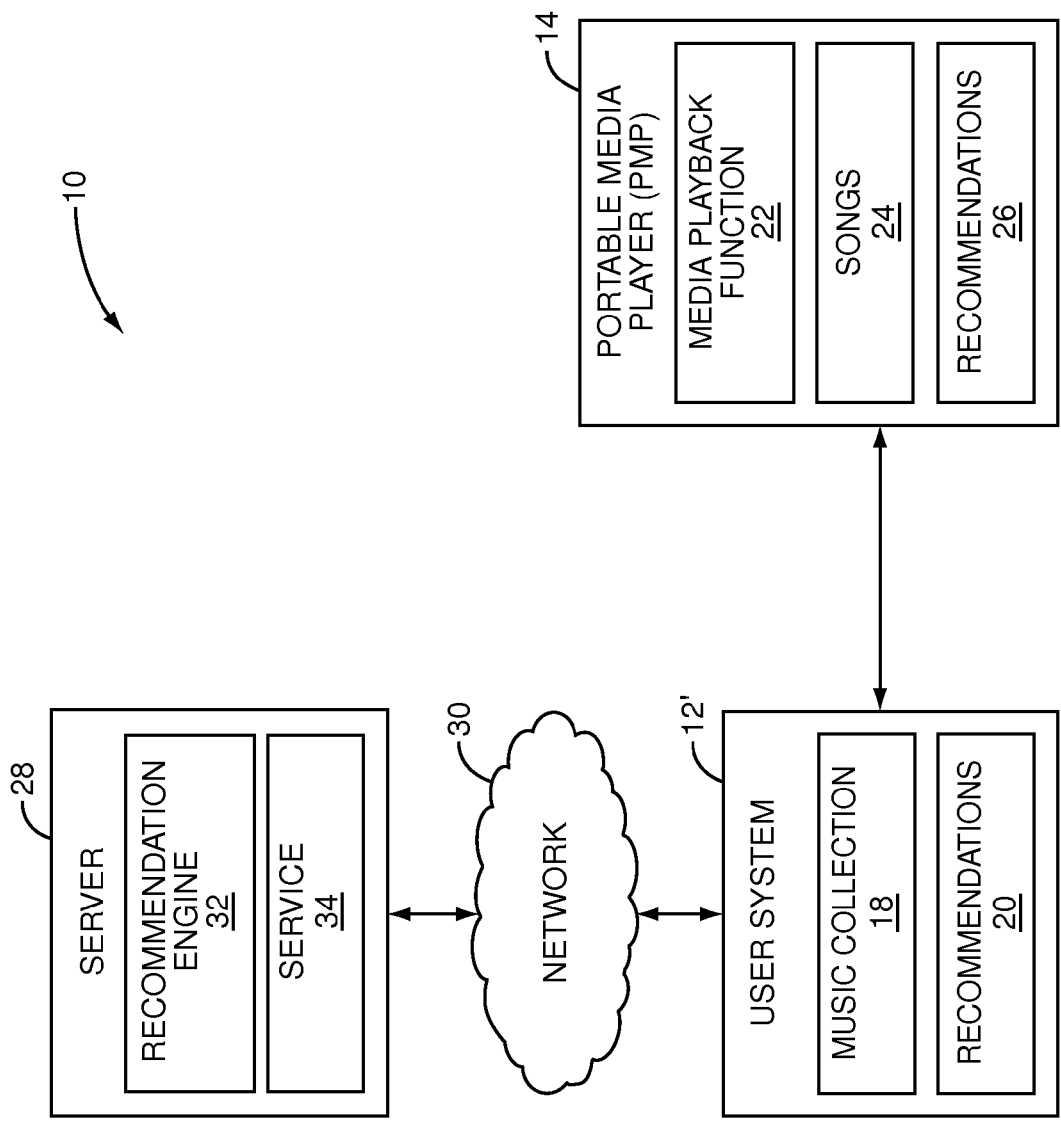
FIG. 4 illustrates a system for embedding recommendations on a portable media player according to a second embodiment of the present invention.

FIG. 4 illustrates the system 10 according to a second embodiment of the present invention. In this embodiment, the system 10 includes a server 28 communicatively coupled to user system 12' via a network 30, wherein the server 28, rather than the user system 12', hosts a recommendation engine 32. In addition, the server 28 may optionally host a service 34. The service 34 may alternatively be hosted by a separate server. The recommendation engine 32 may be implemented in software, hardware, or a combination of software and hardware, and operates to generate the recommendations 20 for a number of songs in the music collection 18 stored on the user system 12'. In one embodiment, the recommendations 20 are limited to other songs in the music collection 18. In another embodiment, the recommendations 20 may include songs from the music collection 18, songs available via the service 34, or a combination thereof. If the recommendations 20 include both songs from the music collection 18 and songs available via the service 34 that are not in the music collection 18, the user may define preferences limiting the number of recommended songs that are not in the music collection 18.

The service 34 may be, for example, a subscription based music service providing access to songs for a subscription fee or an e-commerce service enabling purchase and download of songs. Exemplary subscription based music services include Yahoo! Music Unlimited and RealNetwork's Rhapsody, which each provide access to millions of songs for a monthly subscription fee. Exemplary e-commerce services enabling purchase and download of songs include Apple's iTunes and Napster.

Figure 5:
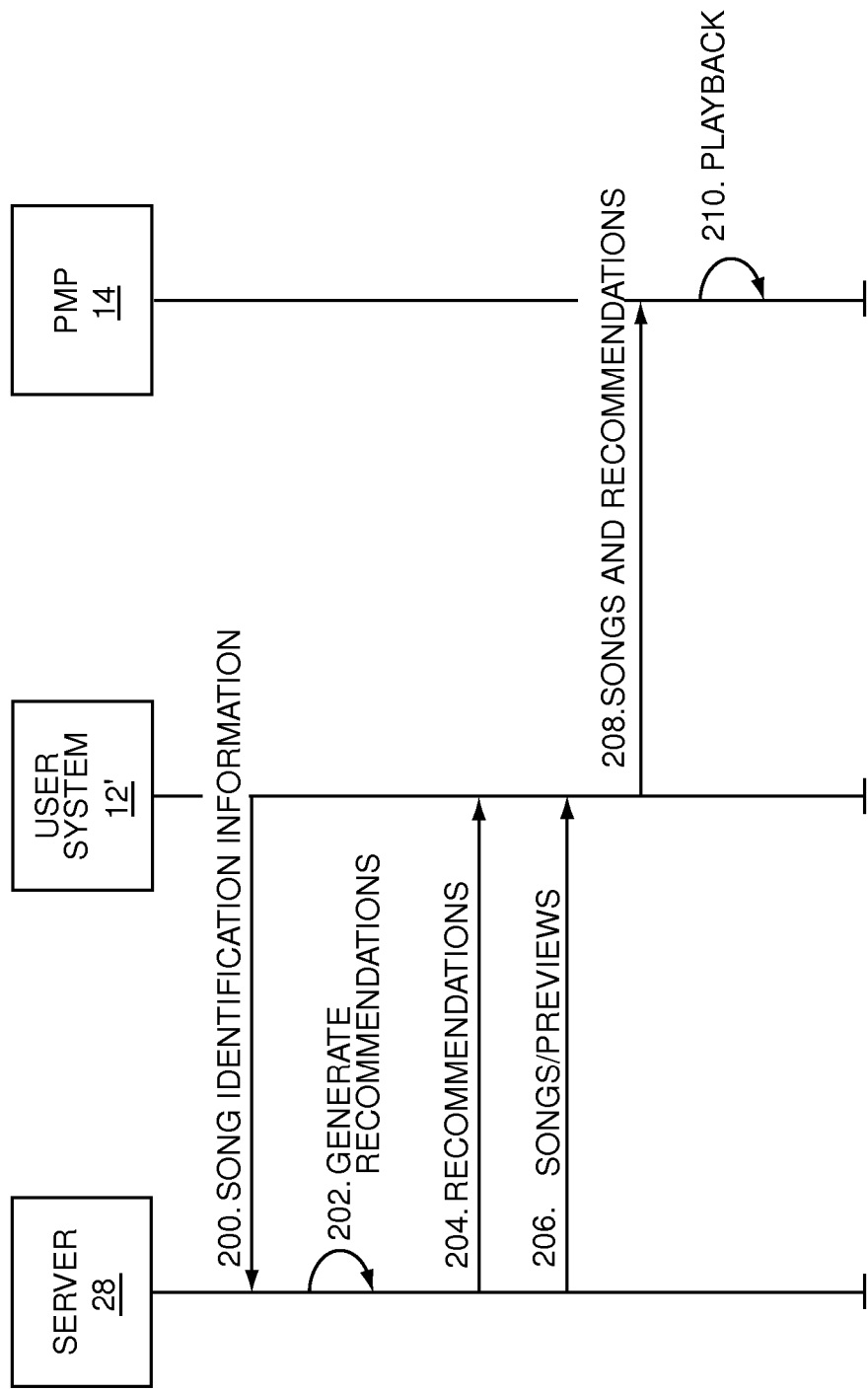
FIG. 5 illustrates the operation of the system of FIG. 4 according to one embodiment of the present invention.

FIG. 5 illustrates the operation of the system 10 of FIG. 4 according to one embodiment of the present invention. First, the user system 12' provides information identifying one or more songs for which recommendations are desired to the server 28 (step 200). The server 28 may optionally verify the identity of the songs. The recommendation engine 32 at the server 28 then generates the recommendations 20 for each of the identified songs (step 202). As discussed above, the recommendations 20 may be generated using any known recommendation scheme. If the recommendations 20 are limited to songs in the music collection 18 or if the recommendations 20 include songs in the music collection 18 and songs not in the music collection 18, the user system 12' may additionally provide information identifying all of the songs in the music collection 18 to the server 28. Alternatively, if the songs in the music collection 18 were obtained via the service 34, the server 28 may obtain information identifying the songs in the music collection 18 from a database associated with the service 34, where the database includes information identifying each song downloaded to the user system 12'.

The server 28 then provides the recommendations 20, or more specifically information identifying the recommended songs for each song identified in step 200, to the user system 12' (step 204). The information identifying the recommended songs may be, for example, Globally Unique Identifiers (GUIDs), titles of the songs, or the like. In addition, for recommended songs available via the service 34, the recommendations 20 may include Uniform Resource Locators (URLs) that may be used to obtain the songs from the service 34. The user system 12' stores the recommendations 20 either in an application file or as metadata within the corresponding song files.

Optionally, for recommended songs that are not stored in the music collection 18, the service 34 may provide the recommended songs, or previews of the recommended songs, to the user system 12' (step 206). The service 34 may provide the recommended songs or previews to the user system 12' automatically in response to instructions from the recommendation engine 32 or in response to a request from the user system 12'.

Thereafter, select songs and the recommendations 20, or a filtered version of the recommendations 20, are provided to the PMP 14 during a synchronization process (step 206). Note that songs for previews that were obtained from the service 34 in step 206 may automatically be transferred to the PMP 14 when the associated songs for which they are recommended are transferred to the PMP 14 or transferred to the PMP 14 only when selected by the user. As discussed above, the recommendations provided to the PMP 14 may optionally be filtered before transferring the recommendations to the PMP 14 to limit the recommendations to songs or previews stored, or to be stored, on the PMP 14. At this point, synchronization is complete, and the PMP 14 uses the recommendations to facilitate playback, as described above (step 210).

Note that previews may be treated like any other recommended song. However, the user of the PMP 14 may mark desired previews such that the corresponding songs are subsequently obtained from the service 34. For example, see U.S. patent application Ser. No. 11/403,499, entitled PORTABLE MEDIA PLAYER ENABLED TO OBTAIN PREVIEWS OF MEDIA CONTENT, filed Apr. 13, 2006; U.S. patent application Ser. No. 11/403,598, entitled USER SYSTEM PROVIDING PREVIEWS TO AN ASSOCIATED PORTABLE MEDIA PLAYER, filed Apr. 13, 2006; and U.S. patent application Ser. No. 11/403,597, entitled CENTRAL SYSTEM PROVIDING PREVIEWS TO A PORTABLE MEDIA PLAYER, filed Apr. 13, 2006, all of which are hereby incorporated herein by reference in their entireties.

Figure 6:
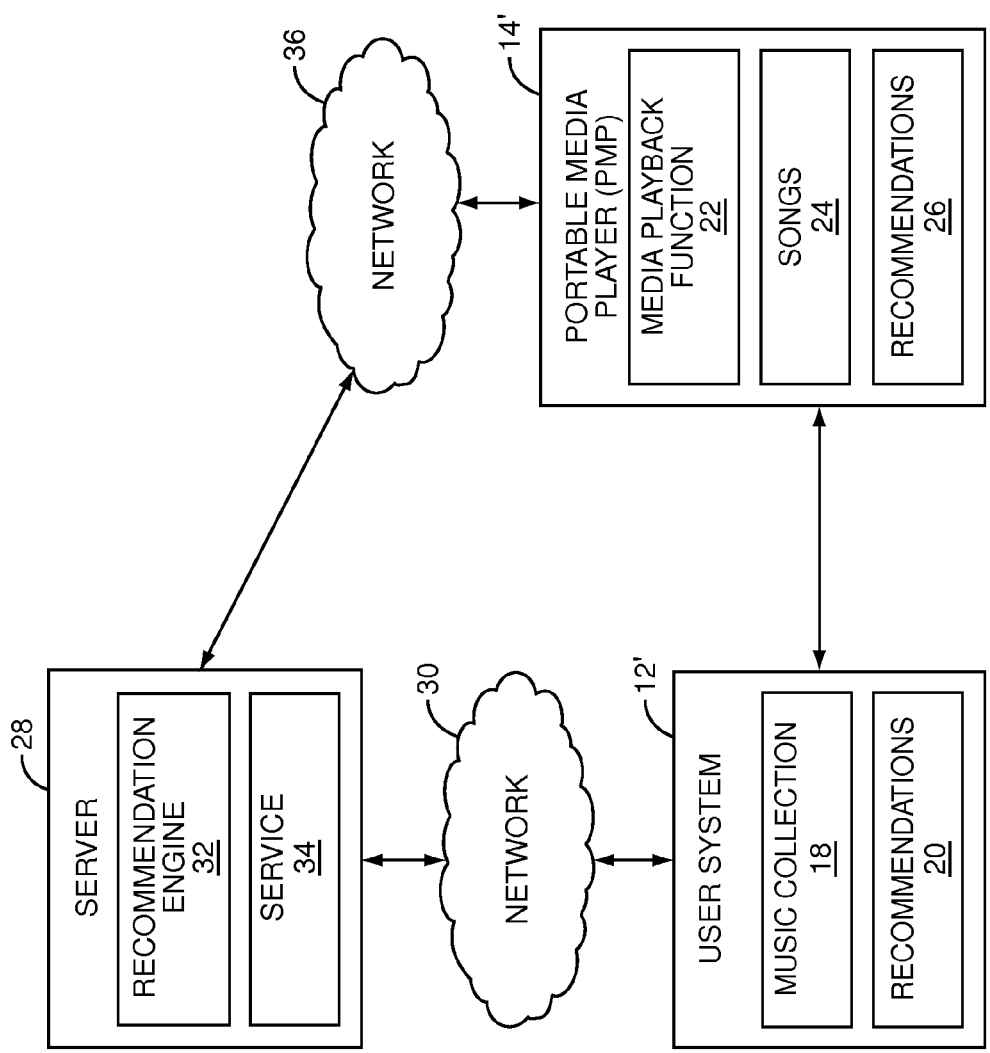
FIG. 6 illustrates a system for embedding recommendations on a portable media player according to a third embodiment of the present invention.

FIG. 6 illustrates the system 10 according to a third embodiment of the present invention, where the system 10 is similar to that illustrated in FIG. 5. In this embodiment, the PMP 14' has access to the service 34 via a network 36. While illustrated separately, the network 36 may be interconnected to or part of the network 30. The PMP 14' preferably has access to the network 36 via a local wireless communication interface or a cellular communication interface. An exemplary local wireless communication interface is a communication interface operating according to one of the suite of IEEE 802.11 standards, the Bluetooth standard, or the like. An exemplary cellular communication interface is a communication interface operating according to the Global System for Mobile Communication (GSM) standard, the Third Generation (3G) Wideband Code Division Multiple Access (WCDMA) standard, or the like.

Figure 7:
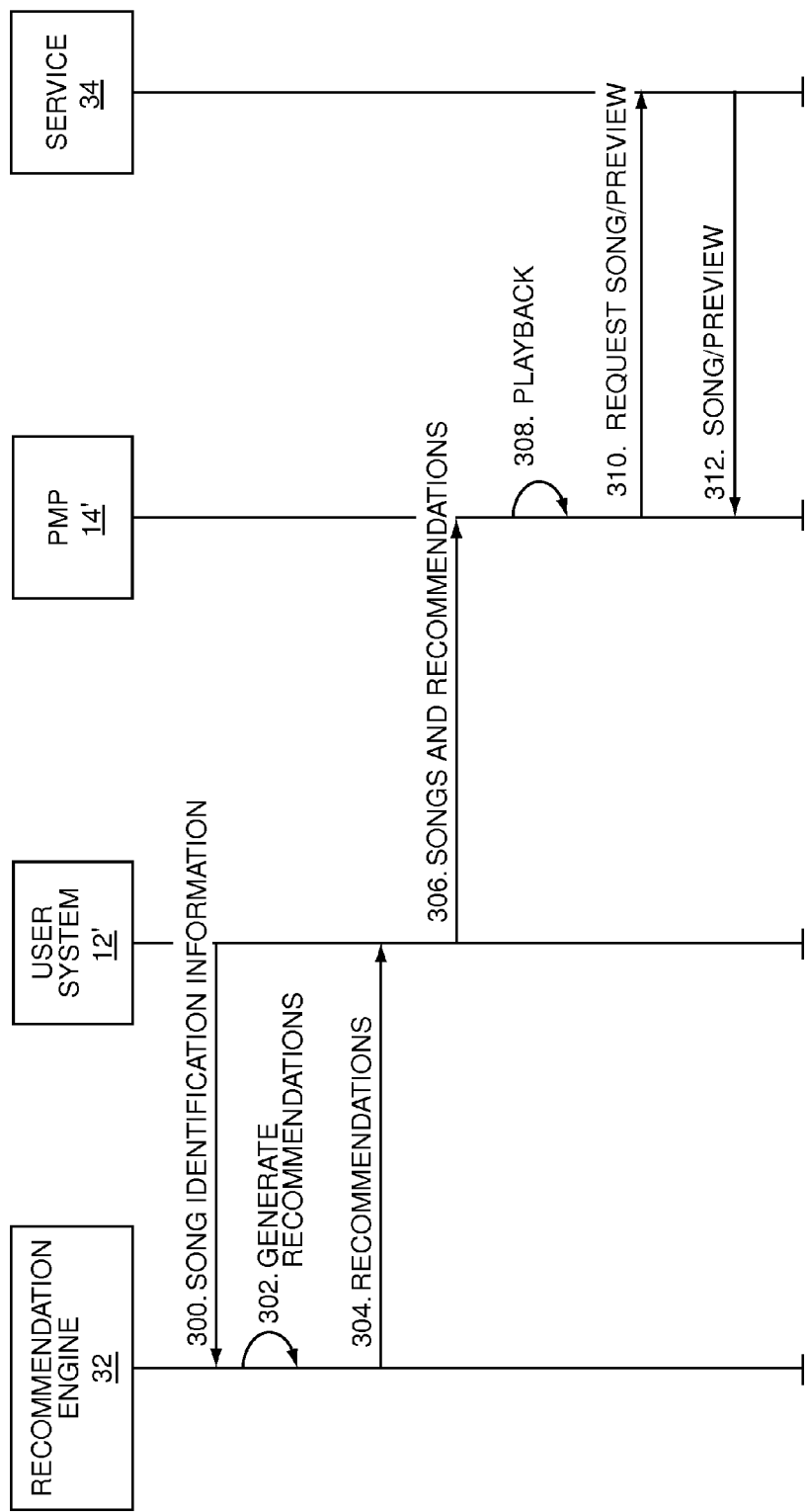
FIG. 7 illustrates the operation of the system of FIG. 6 according to one embodiment of the present invention.

FIG. 7 illustrates the operation of the system 10 of FIG. 6 according to one embodiment of the present invention. First, the user system 12' provides information identifying one or more songs for which recommendations are desired to the recommendation engine 32 (step 300). The recommendation engine 32 at the server 28 then generates the recommendations 20 for each of the identified songs (step 302). As discussed above, the recommendations 20 may be generated using any known recommendation scheme. In this embodiment, the recommendations 20 preferably include songs available to the PMP 14' via the service 34 and, optionally, songs from the music collection 18. The user may define a percentage, or proportion, of the recommendations 20 that are to be songs in the music collection 18. However, the recommendations 20 may alternatively be limited to the songs in the music collection 18.

If the recommendations 20 are limited to songs in the music collection 18 or if the recommendations 20 include both songs in the music collection 18 and songs not in the music collection 18, the user system 12' may additionally provide information identifying all of the songs in the music collection 18 to the recommendation engine 32. Alternatively, if the songs in the music collection 18 were obtained via the service 34, the recommendation engine 32 may obtain information identifying the songs in the music collection 18 from a database associated with the service 34, where the database includes information identifying each song downloaded to the user system 12'.

The recommendation engine 32 then provides the recommendations 20, or more specifically, information identifying the recommended songs for each song identified in step 300, to the user system 12' (step 304). The information identifying the recommended songs may be, for example, GUIDs, titles of the songs, or the like. In addition, for recommended songs available via the service 34, the recommendations 20 may include URLs that may be used to obtain the songs from the service 34. The user system 12' stores the recommendations 20 either in an application file or as metadata within the corresponding song files. Thereafter, select songs and associated recommendations are provided to the PMP 14 during a synchronization process, as described above (step 306).

Once synchronization is complete, the PMP 14 may use the recommendations to facilitate playback, as described above (step 308). During playback of songs on the PMP 14', if the PMP 14' desires to play one of the recommended songs that is not stored on the PMP 14' but is available via the service 34, the PMP 14' may obtain the song or a preview of the song from the service 34 via the network 36 (steps 310-312). For previews, if the user desires to obtain the full song, the PMP 14' may download the full song from the service 34. The user may be required to purchase the song prior to downloading the full song.

Figure 8:
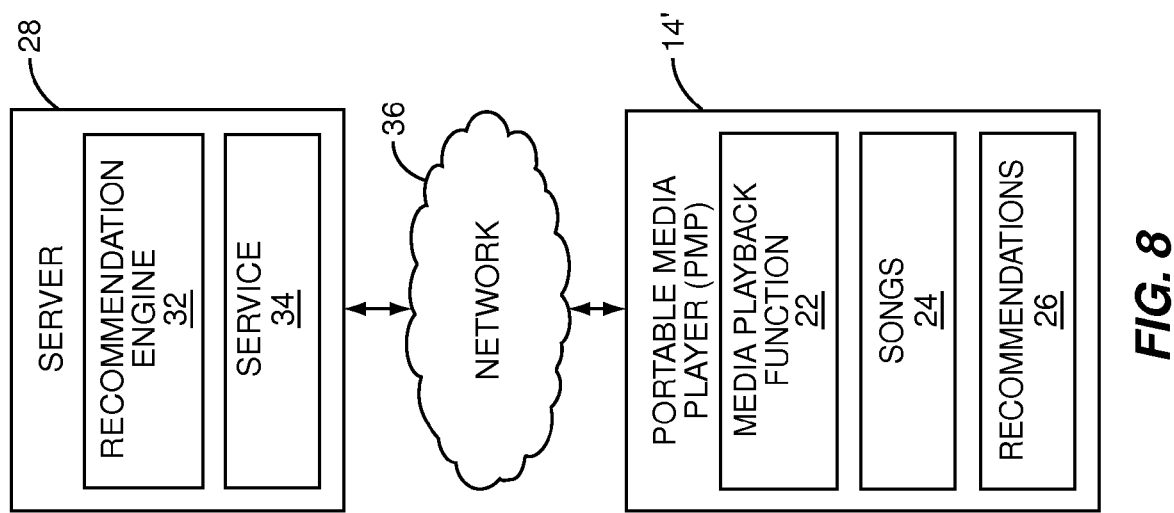
FIG. 8 illustrates a system for embedding recommendations on a portable media player according to a fourth embodiment of the present invention.
Figure 9:
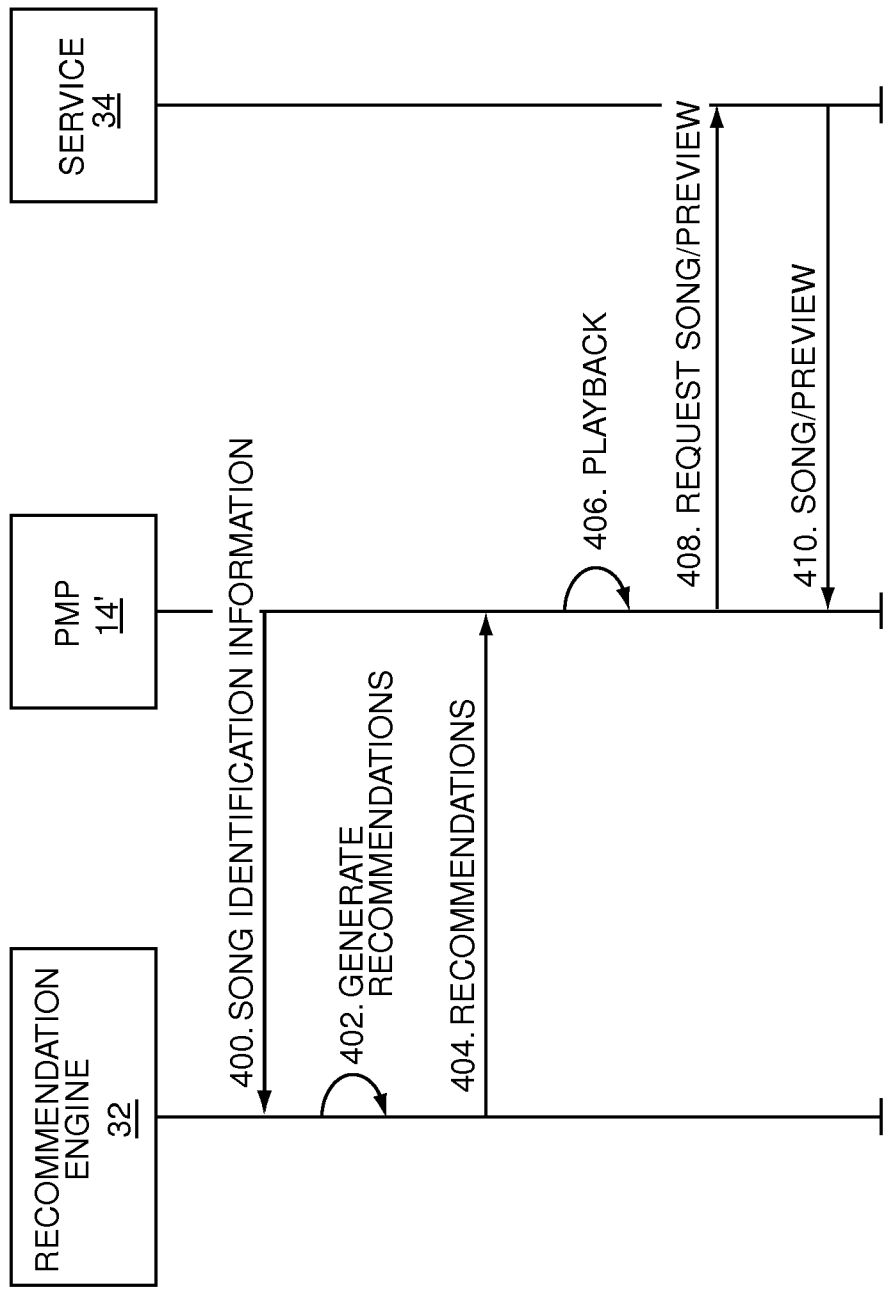
FIG. 9 illustrates the operation of the system of FIG. 8 according to one embodiment of the present invention.

FIG. 8 illustrates the system 10 according to a fourth embodiment of the present invention. In this embodiment, the PMP 14' directly obtains the recommendations 26 from the server 28. FIG. 9 illustrates the operation of the system 10 of FIG. 8 according to one embodiment of the present invention. First, the PMP 14' provides information identifying one or more songs for which recommendations are desired to the recommendation engine 32 (step 400). The recommendation engine 32 at the server 28 then generates the recommendations 26 for each of the identified songs (step 402). As discussed above, the recommendations 26 may be generated using any known recommendation scheme. In this embodiment, the recommendations 26 preferably include songs available to the PMP 14' via the service 34 and, optionally, songs already stored on the PMP 14'. The user may define a percentage, or proportion, of the recommendations 26 that are to be songs already stored on the PMP 14'. Alternatively, the recommendations 26 may alternatively be limited to the songs 24 already stored on the PMP 14'.

If the recommendations 26 include songs already stored on the PMP 14' or if the recommendations 26 are limited to the songs 24 already stored on the PMP 14', the PMP 14' may additionally provide information identifying all of the songs 24 stored on the PMP 14' to the recommendation engine 32. Alternatively, if the songs 24 stored on the PMP 14' were obtained via the service 34, the recommendation engine 32 may obtain information identifying the songs 24 stored on the PMP 14' from a database associated with the service 34, where the database includes information identifying each song downloaded to the PMP 14'.

The recommendation engine 32 then provides the recommendations 26, or more specifically, information identifying the recommended songs for each song identified in step 400, to PMP 14' (step 404). The information identifying the recommended songs may be, for example, GUIDs, titles of the songs, or the like. In addition, for recommended songs available via the service 34, the recommendations 20 may include URLs that may be used to obtain the songs from the service 34. The PMP 14' stores the recommendations 26 either in an application file or as metadata within the corresponding song files. At this point, the PMP 14' uses the recommendations 26 to facilitate playback, as described above (step 406). During playback of songs on the PMP 14', if the PMP 14' desires to play one of the recommended songs that is not stored on the PMP 14' but is available via the service 34, the PMP 14' may obtain the song or a preview of the song from the service 34 via the network 36 (steps 408-410). For previews, if the user desires to obtain the full song, the PMP 14' may download the full song from the service 34. The user may be required to purchase the song prior to downloading the full song.

Figure 10:
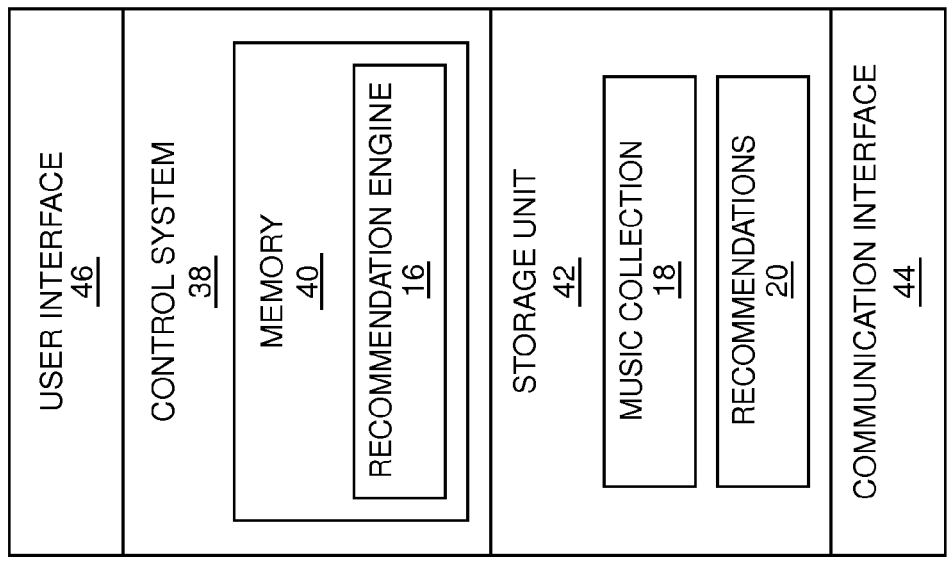
FIG. 10 is a block diagram of an exemplary embodiment of the user system of FIGS. 1 and 2.

FIG. 10 is a block diagram of an exemplary embodiment of the user system 12 of FIGS. 1 and 2. In general, the user system 12 includes a control system 38 having associated memory 40. In this example, the recommendation engine 16 is at least partially implemented in software and stored in the memory 40. The user system 12 also includes a storage unit 42, or alternatively one or more storage units, operating to store the music collection 18 and recommendations 20. The storage unit 42 may be any digital storage unit such as, for example, a hard-disc drive, a network drive associated with the user system 12, memory, an optical storage device, or the like. The user system 12 also includes a communication interface 44. The communication interface 44 includes an interface for communicating with the PMP 14 during synchronization. For example, the communication interface 44 may include either a wired interface or a local wireless interface for communicating with the PMP 14. The user system 12 also includes a user interface 46, which may include components such as, for example, a display, one or more user input devices, speakers, and the like.

Figure 11:
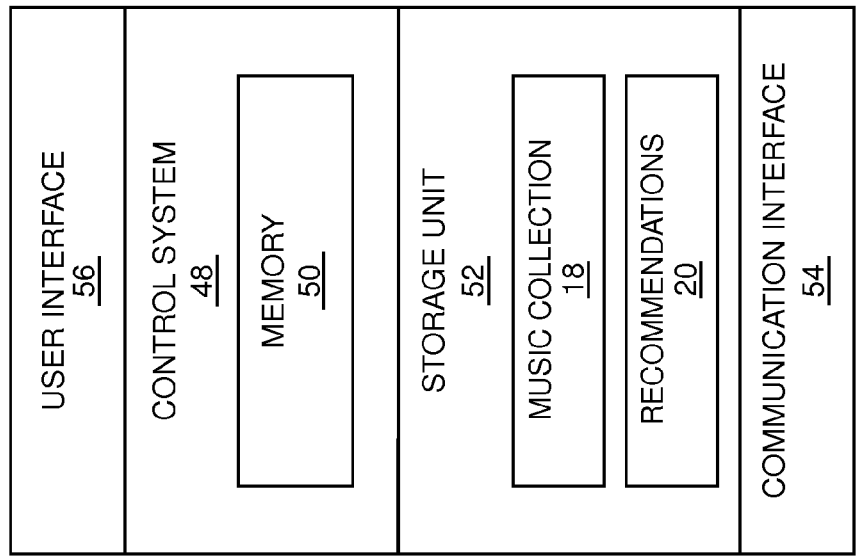
FIG. 11 is a block diagram of an exemplary embodiment of the user system 12' of FIGS. 4-7.

FIG. 11 is a block diagram of an exemplary embodiment of the user system 12' of FIGS. 4-7. In general, the user system 12' includes a control system 48 having associated memory 50. The memory 50 operates to store software instructing the user system 12' to operate according to the present invention. The user system 12' also includes a storage unit 52, or alternatively one or more storage units, operating to store the music collection 18 and recommendations 20. The storage unit 52 may be any digital storage unit such as, for example, a hard-disc drive, a network drive associated with the user system 12', memory, an optical storage device, or the like. The user system 12' also includes a communication interface 54. The communication interface 54 includes an interface for communicating with the PMP 14 during synchronization. For example, the communication interface 54 may include either a wired interface or a local wireless interface for communicating with the PMP 14. In addition, the communication interface 54 includes a network interface communicatively coupling the user system 12' to the network 30 (FIGS. 4, 6). The user system 12' also includes a user interface 56, which may include components such as, for example, a display, one or more user input devices, speakers, and the like.

Figure 12:
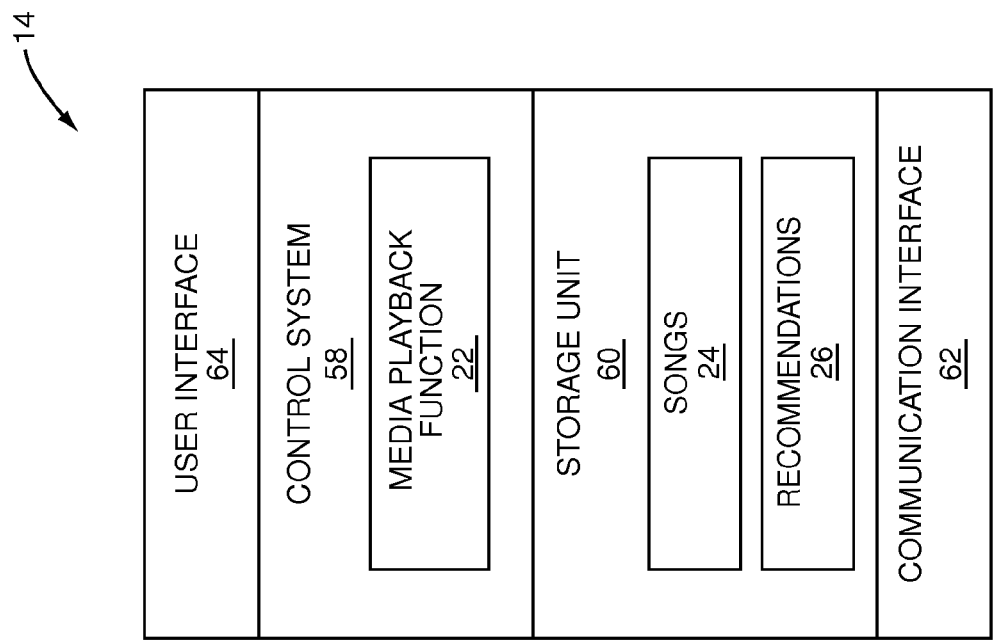
FIG. 12 is a block diagram of an exemplary embodiment of the PMP 14 of FIGS. 1, 2, 4, and 5.

FIG. 12 is a block diagram of an exemplary embodiment of the PMP 14 of FIGS. 1, 2, 4, and 5. In general, the PMP 14 includes a control system 58. In this example, the control system 58 includes the media playback function 22, which may be implemented in software, hardware, or a combination of hardware and software. The PMP 14 also includes a storage unit 60, or one or more storage units, operating to store the songs 24 and recommendations 26. The storage unit 60 may be internal memory, a removable memory card, a hard-disc drive, an optical storage device, or the like. The PMP 14 also includes a communication interface 62. The communication interface 62 includes an interface for communicating with the user system 12, 12' during synchronization. For example, the communication interface 62 may include either a wired interface or a local wireless interface for communicating with the user system 12, 12'. The PMP 14 also includes a user interface 64, which may include components such as, for example, a display; one or more user input devices, buttons, or keys; speakers; audio output ports or jacks; and the like.

Figure 13:
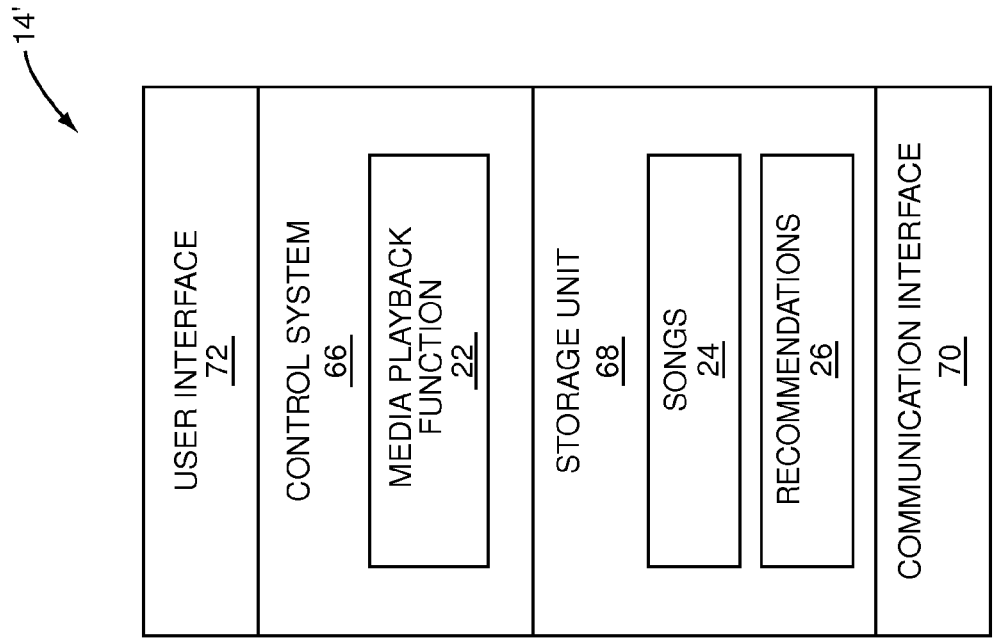
FIG. 13 is a block diagram of an exemplary embodiment of the PMP 14' of FIGS. 6-9.

FIG. 13 is a block diagram of an exemplary embodiment of the PMP 14' of FIGS. 6-9. In general, the PMP 14' includes a control system 66. In this example, the control system 66 includes the media playback function 22, which may be implemented in software, hardware, or a combination of hardware and software. The PMP 14' also includes a storage unit 68, or one or more storage units, operating to store the songs 24 and recommendations 26. The storage unit 68 may be internal memory, a removable memory card, a hard-disc drive, an optical storage device, or the like. The PMP 14' also includes a communication interface 70. The communication interface 70 may include an interface for communicating with the user system 12, 12' during synchronization. For example, the communication interface 70 may include either a wired interface or a local wireless interface for communicating with the user system 12, 12'. The communication interface 70 also includes a network interface to the network 36 (FIGS. 6 and 8). The network interface is preferably either a local wireless communication interface or a cellular network interface. The PMP 14' also includes a user interface 72, which may include components such as, for example, a display; one or more user input devices, buttons, or keys; speakers; audio output ports or jacks; and the like.

FIG. 14 is a block diagram of an exemplary embodiment of the server 28 of FIGS. 4-9. The server 28 generally includes a control system 74. In this example, the recommendation engine 32 and service 34 are implemented as part of the control system 74 and may be implemented in hardware, software, or a combination of hardware and software. The server 28 also includes one or more storage units 76 and a communication interface 78. The communication interface 78 communicatively couples the server 28 to the networks 30 and 36. The server 28 may also include a user interface 80, which may include components such as, for example, a display, one or more user input devices, and the like.

The present invention provides substantial opportunity for variation without departing from the spirit or scope of the present invention. For example, while the discussion herein focuses on digital music, the present invention is not limited thereto. The present invention is equally applicable to other types of media content, such as video content, as will be apparent to one of ordinary skill in the art upon reading this disclosure. Examples of video content are movies, television programs, and like.

As a second example, while the discussion above focuses on generating recommendations for songs identified by either the user system 12, 12' or the PMP 14', the present invention is not limited thereto. More specifically, a service, such as the service 34, may provide a subscription based service or an e-commerce service wherein recommendations for songs are provided upon initial download or purchase from the service 34. Thus, for example, when a user requests a particular song from the subscription based service 34, recommendations for the song may be provided in addition to the song either separately or as metadata within the song file. The recommendations may be generated by the recommendation engine 16, which may be hosted by the same server or a third-party server, prior to or in response to receiving the request for the song. Again, the recommendations may or may not be limited to songs already in the user's music collection 18.

As a third example, while the discussion of FIGS. 1-7 focus on generating recommendations prior to selecting songs for transfer to the PMP 14, 14', the present invention is not limited thereto. More specifically, recommendations may be obtained or generated only for those songs selected to be transferred or transferred to the PMP 14, 14' after the songs are selected to be transferred to transferred to the PMP 14, 14'.

As a fourth example, the discussion of FIGS. 1-7 above focuses on generating recommendations for songs in the music collection 18 of the user system 12, 12'. However, there are situations where songs stored on the PMP 14, 14' are not included in the music collection 18. This may particularly be the case where the PMP 14' obtains music directly from the service 34. In this situation, the user system 12, 12' may obtain information identifying the songs already stored on the PMP 14' during a synchronization process and either generate or obtain recommendations for those songs in addition to or instead of generating or obtaining recommendations for one or more songs from the music collection 18 of the users system 12, 12'.

Those skilled in the art will recognize improvements and modifications to the preferred embodiments of the present invention. All such improvements and modifications are considered within the scope of the concepts disclosed herein and the claims that follow.

What is claimed is:

1. A method of operation of a portable media player, comprising:
receiving, by the portable media player, recommendations for each of a plurality of media presentations stored on the portable media player, wherein for each one of the plurality of media presentations, the recommendations identify at least one of the others of the plurality of media presentations stored on the portable media player recommended for the one of the plurality of media presentations;

storing, by the portable media player, the recommendations in a storage unit of the portable media player; and facilitating, by the portable media player, playback of the plurality of media presentations on the portable media player based on the recommendations;

wherein facilitating playback of the plurality of media presentations on the portable media player based on the recommendations comprises:

playing a select one of the plurality of media presentations; and playing a number of media presentations from a subset of the plurality of media presentations stored on the portable media player that are identified by a user-defined number of levels of the recommendations directly and indirectly associated with the select one of the plurality of media presentations wherein playing the number of media presentations comprises, for each level of the recommendations directly or indirectly associated with the select one of the plurality of media presentations in the user-defined number of levels, playing a number of media presentations identified by at most a user-defined maximum number of recommendations from that level of the recommendations directly or indirectly associated with the select one of the plurality of media presentations.

2. The method of claim 1 wherein receiving the recommendations comprises receiving the recommendations as one of a group consisting of: an application file and a light-weight database.

3. The method of claim 1 wherein receiving the recommendations comprises receiving a plurality of media files corresponding to the plurality of media presentations wherein the recommendations are stored as metadata within the plurality of media files, and storing the recommendations comprises storing the plurality of media files in the storage unit.

4. The method of claim 1 wherein the recommendations are generated at a user system associated with the portable media player and receiving the recommendations comprises receiving the recommendations from the user system during a synchronization process when the portable media player is communicatively coupled to the user system.

5. The method of claim 1 further comprising:

providing information identifying the plurality of media presentations stored on the portable media player to a remote recommendation engine such that the recommendations for each of the plurality of media presentations are generated at the remote recommendation engine;

wherein receiving the recommendations comprises receiving the recommendations from the remote recommendation engine.

6. The method of claim 1 wherein the recommendations are generated at a networked server and provided from the networked server to a user system associated with the portable media player, and receiving the recommendations comprises receiving the recommendations from the user system during a synchronization process when the portable media player is communicatively coupled to the user system.

7. The method of claim 1 wherein the recommendations are generated at a networked server, and receiving the recommendations comprises receiving the recommendations from the networked server via a network communicatively coupling the networked server and the portable media player.

8. The method of claim 7 wherein the recommendations are limited to the plurality of media presentations stored on the portable media player.

9. The method of claim 7 wherein for each of the plurality of media presentations, the recommendations comprise recommendations identifying others of the plurality of media presentations and recommendations identifying media presentations accessible from a network service.

10. The method of claim 1 wherein the recommendations are limited to the plurality of media presentations stored on the portable media player.

11. The method of claim 1 wherein the recommendations are limited to media presentations in a media collection of a user associated with the portable media player stored on an associated user system.

12. The method of claim 1 wherein for each one of the plurality of media presentations, the recommendations further identify at least one recommended media presentation accessible by the portable media player from a network service provider.

13. The method of claim 12 wherein the recommendations further comprise Uniform Resource Locators (URLs) providing access to the at least one recommended media presentation.

14. The method of claim 1 wherein the recommendations further identify at least one preview of a recommended media presentation accessible by the portable media player.

15. The method of claim 1 wherein the plurality of media presentations stored on the portable media player are one of a group consisting of: all media presentations stored on the portable media player and less than all media presentations stored on the portable media player.

16. A method of operation of a portable media player, comprising:

receiving, by the portable media player, recommendations for each of a plurality of media presentations stored on the portable media player, wherein for each one of the plurality of media presentations, the recommendations identify at least one recommended media presentation accessible from a network service recommended for the one of the plurality of media presentations;

storing, by the portable media player, the recommendations in a storage unit of the portable media player; and facilitating, by the portable media player, playback of the plurality of media presentations and the recommended media presentations identified by the recommendations on the portable media player, wherein facilitating playback of the plurality of media presentations on the portable media player based on the recommendations comprises:

playing a select one of the plurality of media presentations; and playing a plurality of media presentations accessible from the network service that are identified by a user-defined number of levels of the recommendations directly and indirectly associated with the select one of the plurality of media presentations, wherein playing the plurality of media presentations comprises, for each level of the recommendations directly or indirectly associated with the select one of the plurality of media presentations in the user-defined number of levels, playing a number of media presentations identified by at most a user-defined maximum number of recommendations from that level of the recommendations directly or indirectly associated with the select one of the plurality of media presentations.

17. The method of claim 16 wherein receiving the recommendations comprises receiving the recommendations as one of a group consisting of: an application file and a light-weight database.

18. The method of claim 16 wherein receiving the recommendations comprises receiving a plurality of media files corresponding to the plurality of media presentations wherein the recommendations are stored as metadata within the plurality of media files, and storing the recommendations comprises storing the plurality of media files in the storage unit.

19. The method of claim 16 wherein the recommendations are generated at a networked server and provided to a user system associated with the portable media player, and receiving the recommendations comprises receiving the recommendations from the networked server during a synchronization process when the portable media player is communicatively coupled to the user system.

20. The method of claim 16 wherein the recommendations are generated at a networked server, and receiving the recommendations comprises receiving the recommendations from the networked server via a network communicatively coupling the networked server and the portable media player.

21. The method of claim 16 wherein playing the plurality of media presentations accessible from the network service that are identified by the user-defined number of levels of the recommendations directly and indirectly associated with the select one of the plurality of media presentations further comprises obtaining one or more of the plurality of media presentations from the network service.

22. The method of claim 16 wherein for each level of the recommendations directly or indirectly associated with the select one of the plurality of media presentations in the user-defined number of levels, playing the number of media presentations identified by at most the user-defined maximum number of recommendations from that level of the recommendations directly or indirectly associated with the select one of the plurality of media presentations comprises:
obtaining a preview of at least one of the number of media presentations from the network service; and
playing the preview of the at least one of the number of media presentations.

23. The method of claim 16 wherein the plurality of media presentations stored on the portable media player are one of a group consisting of: all media presentations stored on the portable media player and less than all media presentations stored on the portable media player.

24. A portable media player comprising:
a communication interface; and
a control system associated with the communication interface and adapted to:
receive recommendations for each of a plurality of media presentations stored on the portable media player, wherein for each one of the plurality of media presentations, the recommendations identify at least one of the others of the plurality of media presentations stored on the portable media player recommended for the one of the plurality of media presentations;
store the recommendations in a storage unit of the portable media player; and
facilitate playback of the plurality of media presentations on the portable media player based on the recommendations;
wherein in order to facilitate playback of the plurality of media presentations on the portable media player based on the recommendations, the control system is further adapted to:
play a select one of the plurality of media presentations; and
play a number of media presentations from a subset of the plurality of media presentations stored on the portable media player that are identified by a user-defined number of levels of the recommendations directly and indirectly associated with the select one of the plurality of media presentations;
further wherein in order to play the number of media presentations, the control system is further adapted to, for each level of the recommendations directly or indirectly associated with the select one of the plurality of media presentations in the user-defined number of levels, play a number of media presentations identified by at most a user-defined maximum number of recommendations from that level of the recommendations directly or indirectly associated with the select one of the plurality of media presentations.

25. A portable media player comprising:
a communication interface; and
a control system associated with the communication interface and adapted to:
receive recommendations for each of a plurality of media presentations stored on the portable media player, wherein for each one of the plurality of media presentations, the recommendations identify at least one recommended media presentation accessible from a network service recommended for the one of the plurality of media presentations;
store the recommendations in a storage unit of the portable media player; and
facilitate playback of the plurality of media presentations and the recommended media presentations identified by the recommendations on the portable media player;
wherein in order to facilitate playback of the plurality of media presentations on the portable media player based on the recommendations, the control system is further adapted to:
play a select one of the plurality of media presentations; and
play a plurality of media presentations accessible from the network service that are identified by a user-defined number of levels of the recommendations directly and indirectly associated with the select one of the plurality of media presentations; and
further wherein in order to play the plurality of media presentations, the control system is further adapted to, for each level of the recommendations directly or indirectly associated with the select one of the plurality of media presentations in the user-defined number of levels, play a number of media presentations identified by at most a user-defined maximum number of recommendations from that level of the recommendations directly or indirectly associated with the select one of the plurality of media presentations.

26. The portable media player of claim 24 wherein the plurality of media presentations stored on the portable media player are one of a group consisting of: all media presentations stored on the portable media player and less than all media presentations stored on the portable media player.

27. The portable media player of claim 25 wherein the plurality of media presentations stored on the portable media player are one of a group consisting of: all media presentations stored on the portable media player and less than all media presentations stored on the portable media player.

* * * * *